United States Patent
Lachman

[15] 3,653,194
[45] Apr. 4, 1972

[54] ASPARAGUS HARVESTING DEVICE

[72] Inventor: Myron C. Lachman, Rural Route 1, Paw Paw, Mich. 49079

[22] Filed: Feb. 5, 1970

[21] Appl. No.: 8,913

[52] U.S. Cl. .................................. 56/327 A, 56/DIG. 15
[51] Int. Cl. ...................................................... A01d 45/00
[58] Field of Search ................ 56/327, DIG. 15; 171/53, 54, 171/56, 61

[56] References Cited

UNITED STATES PATENTS

| | | | |
|---|---|---|---|
| 3,472,009 | 10/1969 | Porter | 56/327 A |
| 3,163,974 | 1/1965 | Mack | 56/DIG. 15 |
| 3,137,984 | 6/1964 | Shonkwiler | 56/DIG. 15 |
| 2,581,119 | 1/1952 | Matteoli | 56/327 A |
| 3,328,943 | 7/1967 | Marmorine et al. | 56/327 A |
| 3,412,540 | 11/1968 | Lawson | 56/327 A |

Primary Examiner—Louis G. Mancene
Assistant Examiner—D. L. Weinhold
Attorney—Roy A. Plant

[57] ABSTRACT

A cutter bar mounted for forward movement generally parallel to and above the surface of the ground to cut asparagus stalks at a generally uniform height, with a catcher plate disposed adjacent and generally parallel to the cutter and a rotatable reel disposed above the catcher plate to sweep over the same and thereby move the cut stalks of asparagus from the catcher to a belt-type conveyor disposed behind the cutter and catcher plate, and with an impeller for drawing foreign constituents off and away from the cut stalks while they are being conveyed, wherein the opening height of the cutter is continuously controlled by hydraulic power cylinders in response to the actual level of the ground immediately ahead of the cutter, sensed by ground-engaging runner elements coupled to a control valve for the hydraulic cylinders.

19 Claims, 10 Drawing Figures

INVENTOR
MYRON C. LACHMAN

BY Roy A. Plant

ATTORNEY

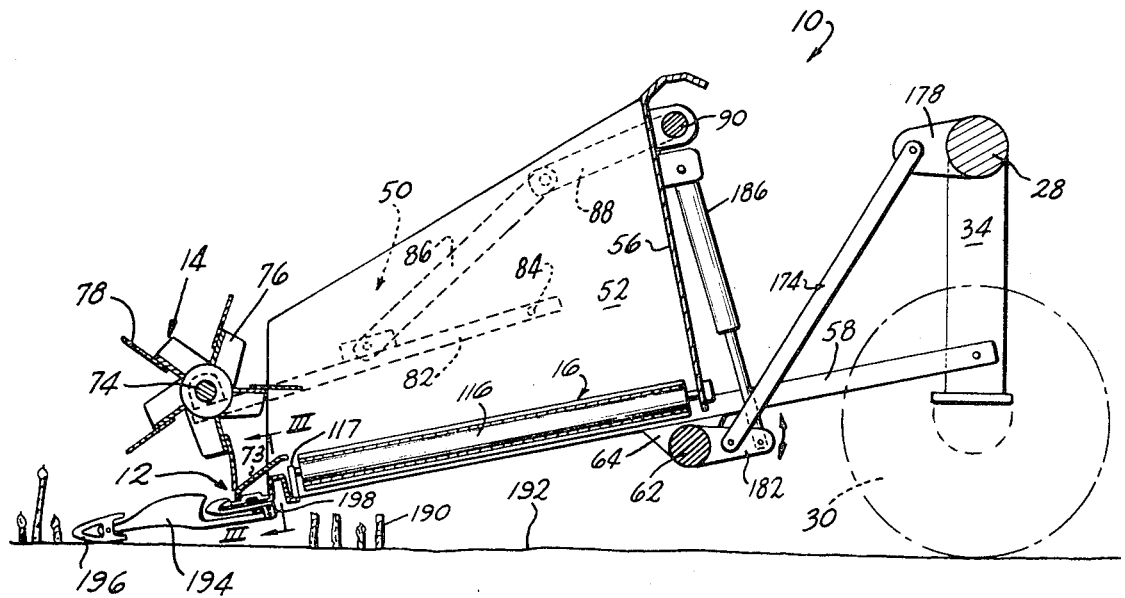
FIG. 2
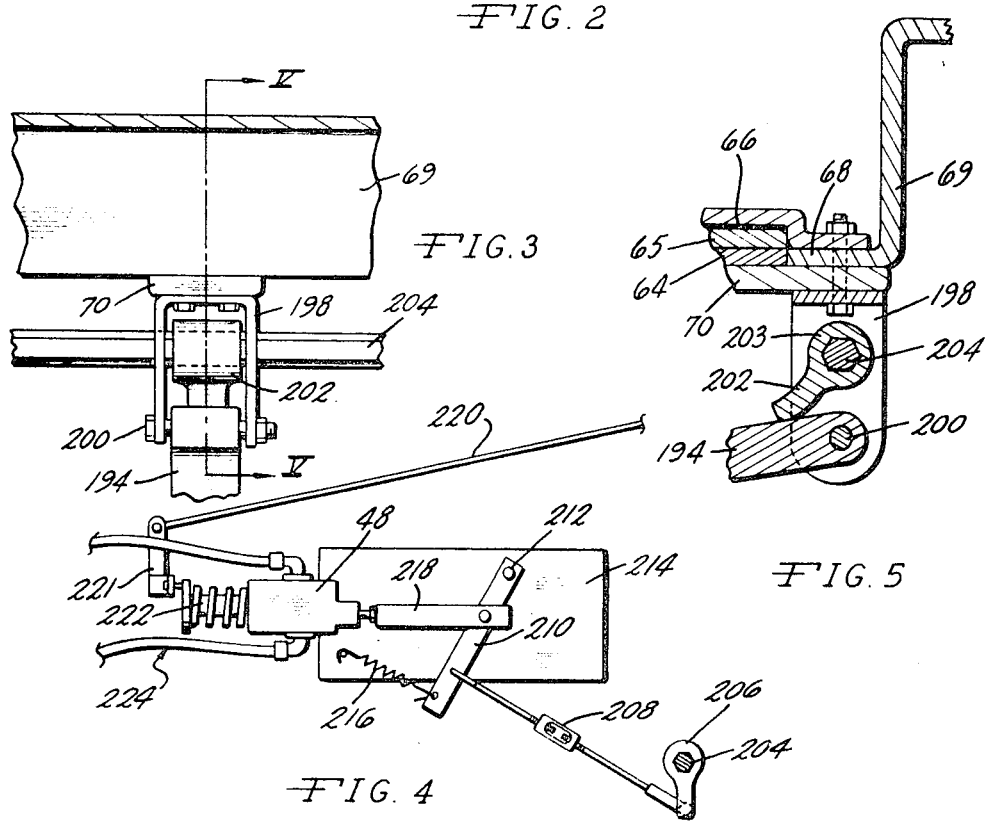
FIG. 3
FIG. 5
FIG. 4
INVENTOR
MYRON C. LACHMAN
BY Roy A. Plant
ATTORNEY

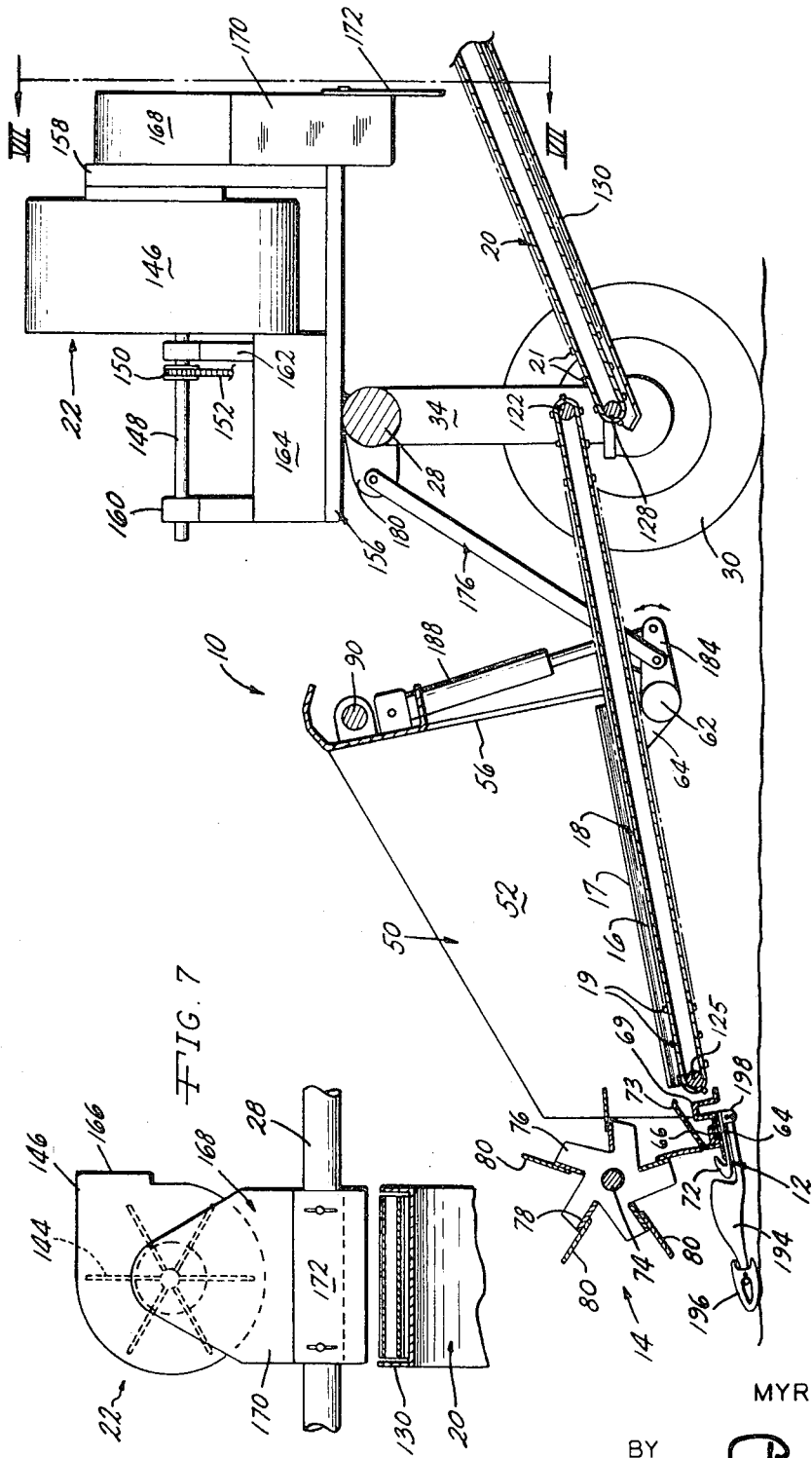

INVENTOR
MYRON C. LACHMAN
BY Roy A. Plant
ATTORNEY

ASPARAGUS HARVESTING DEVICE

BACKGROUND OF THE INVENTION

Mechanical harvesting devices for eliminating most of the usual labor requirements and greatly reducing the time required in harvesting growing crops have been the subject of considerable design and developmental activity and effort in recent years, and this activity has resulted in a number of new or improved devices for practically all of the many different crops presently being grown.

One crop whose harvesting raises particular difficulty is asparagus, whose physical nature and whose growing habits are considerably different from those of most other types of vegetables. Developments in mechanized or automated harvesting equipment for asparagus have therefore not taken the same course as developments in harvesters for other crops, and have not attained the same level of achievement as has been true in connection with harvesters for many other crops. This result has also been brought about by the complicating fact that there is a considerable difference of opinion between different asparagus growers as to the proper or best basic method of harvesting the asparagus. That is, some feel that the asparagus should be cut beneath the surface of the ground, while others feel that it should be cut above the surface of the ground, and these two differing approaches clearly involve considerably different design concepts.

Furthermore, the predominating opinion in the past was that a really effective asparagus harvester should be selective in its operation, on an individual asparagus stalk basis, harvesting those stalks having at least a predetermined minimum size, and not harvesting those of a size lesser than the established minimum. Such selective devices are exceedingly slow in operation and extremely complicated from the standpoint of mechanical design. As a result, they are expensive to manufacture and purchase, and they also require considerable maintenance and adjustment.

THE PRESENT INVENTION

The present invention is based on a conceptual departure from the types of asparagus harvesters proposed heretofore, and involves the use of an elongated cutter bar which cuts a complete swath of asparagus stalks at a generally uniform height. The operating height of the cutter is continuously controlled and varied so that the cutter will always cut at a predetermined level above the actual surface of the ground, compensating for deviations and variations in the ground surface as the same actually occur.

This continuous control provides two important advantages: firstly, a high-grade product is achieved, because the actual cutting height of the device, as a result of its continuously controlled operation, cuts asparagus stalks or spears at a level which harvests the tender and choice portion of the stalk and which leaves the woody, fibrous portion in the ground; secondly, the operating speed of the device is very much faster than individually selective harvesters. Furthermore, the mechanism itself can be less complex and of considerably reduced manufacturing difficulty, thereby providing a machine which can be more economically manufactured and sold to the ultimate user.

Accordingly, stated in brief, summary form, the major objectives of the invention are to provide a new form of asparagus-harvesting machine having a linear cutter bar which is continuously repositioned in accordance with the actual contours of the ground on which the asparagus is grown, which provides a catching or receiving surface for the cut asparagus and which gently sweeps the cut asparagus from the catcher onto a conveyor for transfer to a wagon or other such place of temporary storage, and in which weeds, grass, and other foreign constituents are automatically removed from the asparagus after the same is cut but before it is temporarily stored. Preferably, the cutter bar is positioned by the hydraulic ram of at least one power cylinder controlled by a valve which is itself controlled by ground-engaging runner-like feeler arm sensor elements which project forwardly of the cutter and monitor the level of the ground immediately ahead of the same.

IN THE DRAWINGS

FIG. 2 is a sectional side elevation of the device, taken through the plane II—II of FIG. 1;

FIG. 3 is an enlarged, fragmentary sectional elevation of the ground-following control mechanism, taken along the plane III—III of FIG. 2;

FIG. 4 is an enlarged, fragmentary sectional elevation taken through the plane IV—IV of FIG. 1;

FIG. 5 is a sectional elevation taken through the plane V—V of FIG. 3;

FIG. 6 is a sectional side elevation of the device taken through the plane VI—VI of FIG. 1;

FIG. 7 is a sectional rear elevation of the device, taken through the plane VII—VII of FIG. 6;

PREFERRED EMBODIMENT

Figure 1:
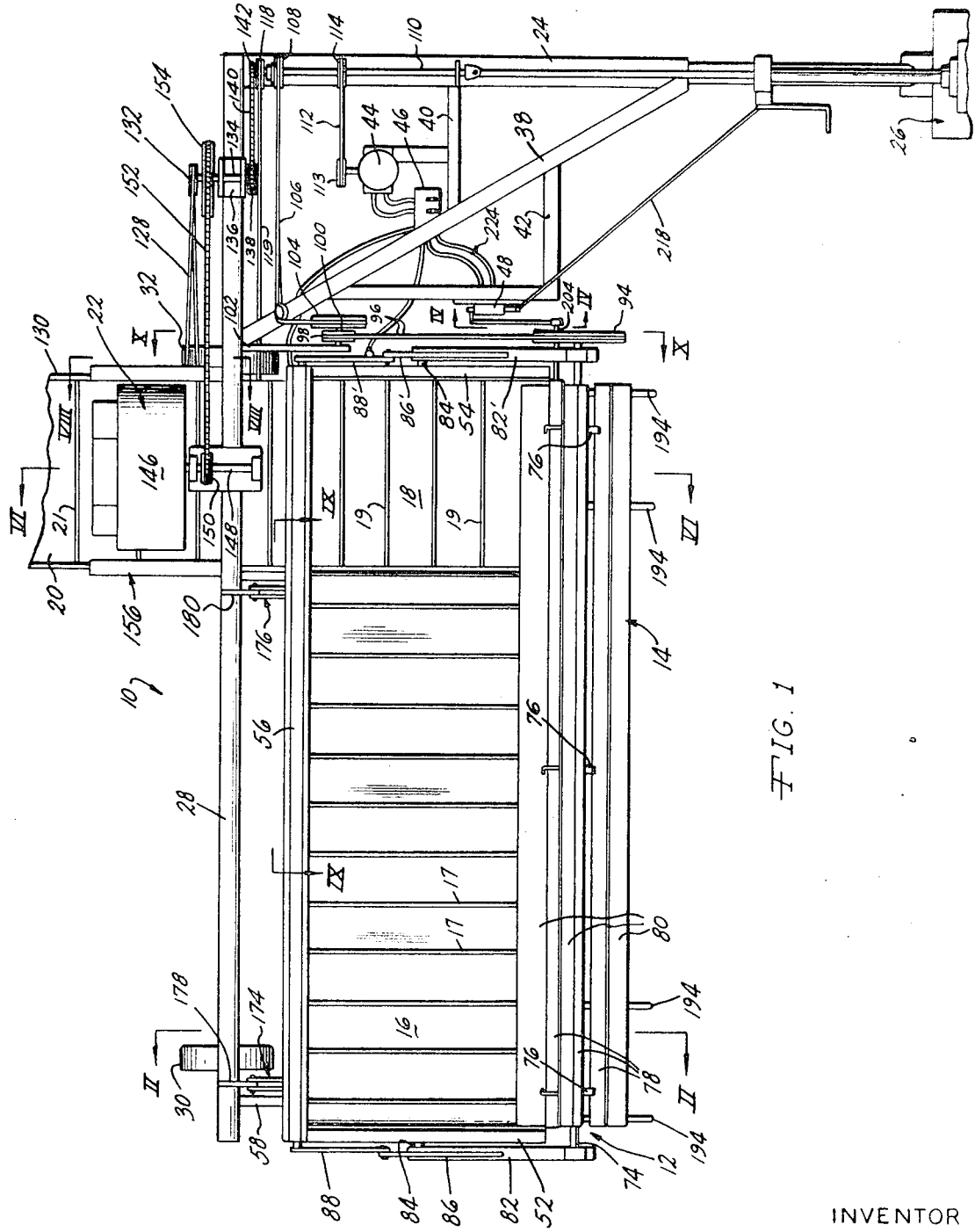
FIG. 1 is a fragmentary overhead plan view of a preferred form of a harvester in accordance with the invention.

Referring now in more detail to the drawings, and with particular reference to FIGS. 1, 2 and 6, the harvester device 10 of the invention comprises a cutter bar assembly 12, a sweeper or reel assembly 14, a lateral conveyor 16, a pair of cooperative end-to-end vertical conveyors 18 and 20, respectively, an air-drawing impeller means 22 mounted above vertical conveyor 20, and other associated and supporting elements and structures described in more detail hereinafter.

From an overall, structural point of view, the device 10 comprises a wheeled vehicle having a tongue 24 (FIG. 1) by which it may be drawn, as by a tractor 26 or the like. The forwardly projecting tongue 24 is rigidly attached to a rigid, elongate primary support bar 28, which extends laterally of the tongue and parallel to the cutter and reel 12 and 14, respectively, mentioned previously. The support bar 28 is positioned directly above a pair of spaced wheels 30 and 32, upon which the harvester is rolled, with a rigid brace 34 or 36 extending upwardly from the spindle of each wheel to the support bar and holding the latter in place. As stated previously, the tongue 24 and support bar 28 are rigidly interconnected, as by welding, and rigid connecting braces such as 38 (FIG. 1) are preferably welded or otherwise secured in place across the angle between the tongue and the support bar to further strengthen the assembly. Also, appropriate braces and brackets 40 and 42 may be attached to the angular brace 38 and between it and the tongue 24, for example, to support a hydraulic pump 44, fluid manifold 46, and a control valve 48, whose function is described more fully hereinafter. The support bar 28 is the primary structural component of the harvester apparatus, and this bar is pivotal about the axis of the wheels 30 and 32 by vertical movements of the tongue 24, but it is otherwise fixed and rigid in position.

Figure 10:
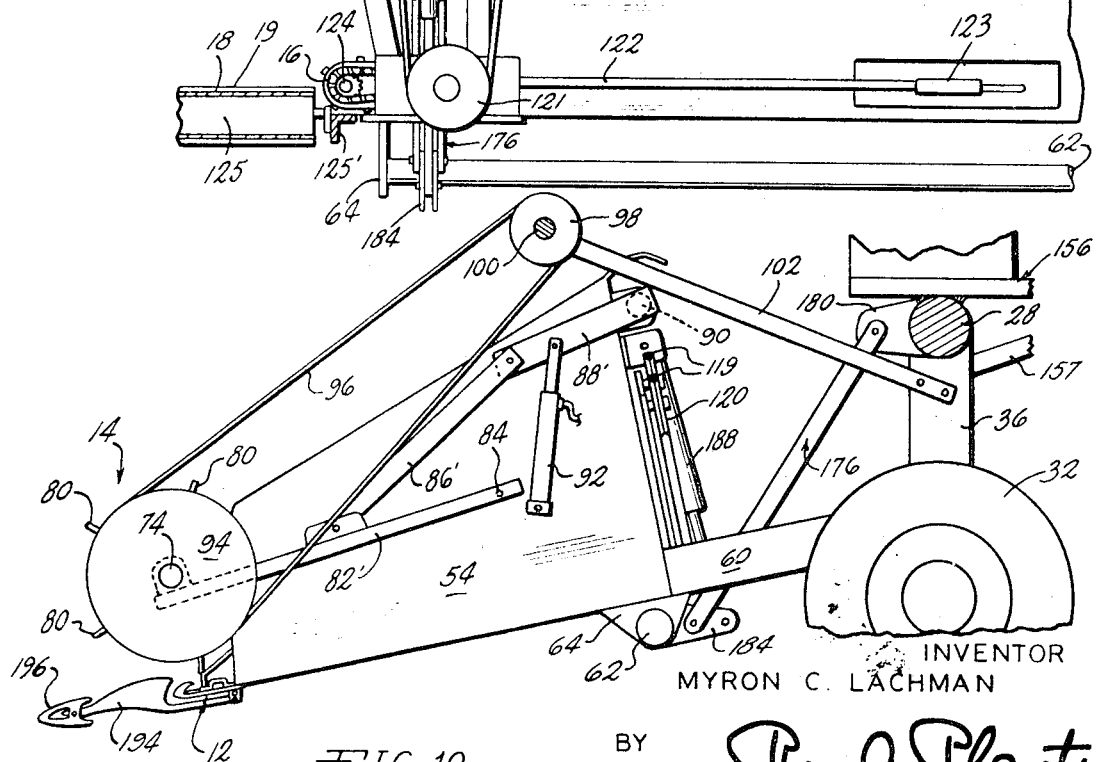
FIG. 10 is a sectional side elevation taken through the plane X—X of FIG. 1.

The aforementioned lateral conveyor 16 and the co-planar first vertically movable conveyor 18 form the floor of a box-like three-sided bed or receptacle 50 (FIGS. 2 and 6), defined by side walls 52 and 54, and a rear wall 56. It is into this bed or receptacle that the cut asparagus is moved by the operation of the sweeper reel 14 mentioned previously, with the conveyor 16 operating to move the asparagus from left to right as seen in FIG. 1, i.e., toward the first vertical conveyor 18, which then lifts the harvested asparagus to conveyor 20. The walls forming the receptacle 50 and the conveyors 16 and 18 are supported by a pair of spaced rigid braces 58 and 60 (FIGS. 1, 2 and 10) which are pivotally attached to the upright braces 34 and 36, respectively, which interconnect the wheels 30 and 32 to the elongated primary support bar 28. Also, a rigid tubular support shaft or bar 62 extends beneath braces 58 and 60 to interconnect the same and rigidify the structure. Support bar 62 is rotatably mounted, being journaled in bearing plates or blocks 64 attached directly to braces 58 and 60.

The cutter assembly 12 mentioned previously is disposed along the open front of the aforementioned bed or receptacle 50, immediately adjacent the lateral conveyor 16, and directly beneath the reel 14. Basically, the cutter comprises a sickle bar, having a series of saw tooth-like sickle blade sections 64 (FIGS. 5 and 6) mounted upon an elongated cutter bar 65, which is retained in place between a series of hold-down clips 66 bolted to the lower flange portion 68 of an elongated, channel-shaped mounting post 69 and a series of support plate members 70 lying beneath the sickle bar, also bolted to the flange portion 68 of mounting post 69. The mounting post or channel 69 is preferably rigidly interconnected with the side walls 52 and 54 of the bed or receptacle 50, and a plurality of spaced combs or teeth 72 are formed on or secured to the support plate members 70 to extend forwardly of the sickle bar and form a guard for it. To this extent, the cutter assembly 12 will be recognized as basically being a conventional piece of equipment, of a type having long experience and proven reliability in other applications, although not believed to have been used heretofore in asparagus harvesting. However, it is to be observed that in accordance with the invention a catcher plate 73 (FIGS. 2 and 6) is provided as a part of the cutter bar assembly. Preferably, the catcher plate comprises an elongated section of sheet metal or the like which angles upwardly and rearwardly of the sickle blade, and which may be mounted atop the hold-down members 66. Basically, the catcher 73 receives the asparagus as it is cut by the sickle bar and provides a momentary resting point away from the sickle until the reel 14 sweeps the asparagus off the catcher plate and into the bed 50.

In the structural arrangement described, it will thus be recognized that the entire cutter assembly 12 is supported in a unitary manner with the bed 50, the lateral conveyor 16, and the first vertical conveyor 18, all of which are supported upon the aforementioned braces 58 and 60 and can be pivoted in unison thereupon with respect to the primary support bar 28. This is also true of the reel or sweeper 14, which comprises an elongated five-rail structure which is rotatable about an axial mounting shaft 74 (FIGS. 1, 2, and 6).

More specifically, the reel 14 comprises a series of star-like five-bladed mounting arms 76 which are secured to the mounting shaft 74, with a series of five slats 78 being attached in place between the spaced-apart arms 76, extending generally parallel to the axial shaft 74. Each of the slats 78 supports a radially extending sweeper element 80 which is attached thereto. The sweeper elements 80 should be of a resilient material which will not damage or bruise the asparagus, but should nonetheless have sufficient body to sweep the cut asparagus off the catcher plate 73 and onto the conveyors 16 and 18. A preferred material for this purpose is a rubberized belting, of only moderate stiffness. The axial shaft 74 for the reel 14 is mounted at each end between a pair of support arms 82, 82' (FIGS. 1, 2 and 10) which are pivotally attached at their end opposite the reel to the sides 52 and 54 of the asparagus receptacle 50, as by a pivot pin 84 or the like. Thus, the entire reel assembly 14 can be pivoted about the pin 84 to raise and lower the reel with respect to the cutter assembly. For this purpose, the support arms 82, 82' are connected by linkages 86, 88 and 86', 88', respectively, to opposite ends of an elongated rotatable support shaft 90 (FIGS. 2, 6, 9 and 10). A hydraulic power cylinder 92 (FIG. 10) is attached to side wall 54 and has its ram or piston pivotally attached to linkage 88', so that the reel 14 may be raised and lowered in an automated manner and without the requirement of manual effort.

On the end of the axial reel shaft 74 nearest the tongue 24 by which the harvester is drawn, a pulley wheel or sheave 94 (FIGS. 1 and 10) is mounted, such that the reel 14 may be rotatably driven by a V-belt 96 entrained over pulley 94 and another pulley wheel 98, located near the rear of the harvester, the latter being non-rotatably mounted upon a drive shaft 100. This shaft is rotatably mounted in a support arm 102 and driven by a coaxial pulley wheel 104, about which is entrained a V-belt 106 extending from a take-off pulley 108 mounted on an elongated rotary power take-off shaft 110 supported atop the tongue 24 and coupled to the power take-off of the tractor or other such pulling vehicle 26. As will be seen all of the operating power for the different parts of the present device is taken from the power take-off of the pulling vehicle, by a series of pulley wheels or sprockets mounted along the length of the aforementioned shaft 110 supported atop the drawbar or tongue 24 of the harvester. In this connection, it may be seen that the hydraulic pump 44 mentioned previously is driven by a belt 112 (FIG. 1) entrained about a pulley 113 mounted on the drive shaft for the pump and a second pulley 114 mounted on the power take-off shaft 110. Furthermore, the drive for the sickle bar of the cutter assembly is also taken from power take-off shaft 110, by means of a pulley wheel 118 mounted thereon. A V-belt 119 entrained over pulley 118 extends laterally of the machine and toward its center area, beneath the blower means 22 and around a pair of guide sheaves 120 and 120' (FIG. 9), to drive a pulley wheel 121. Pulley wheel 121 drives a co-axially mounted eccentric and yoke mechanism (not specifically shown) which reciprocates a pitman arm 122 connected to a swaybar assembly 123 of a known type, which extends under the bed 50 and is connected to the sickle bar 65 mentioned previously, to effect reciprocation of the latter and of the sickle knives 64 carried thereby.

The conveyors 16, 18 and 20 are all preferably comprised of movable members made from relatively lightweight and very flexible rubberized canvas or other such fabric, made into endless belts and supported at opposite ends upon rollers, in a generally conventional manner. All such conveyor members preferably have spaced cleats 17, 19, and 21, respectively, comprising wood strips or the like, secured transversely across the belts, to the outer surfaces thereof. As will be understood, the presence of such cleats will considerably augment the conveying by the belts of the asparagus stalks deposited thereon. The end of conveyor 16 which is closest to side wall 52 is supported on an idler roller 116 (FIG. 2), which is rotatably mounted on the rear wall 56 at one of its ends and to a bracket 117 at its other end, such bracket being rigidly attached to the side wall 52. At its opposite end, the conveyor 16 is entrained over a chain-driven shaft 124 (FIG. 9), by which motion is imparted to this conveyor.

Figure 8:
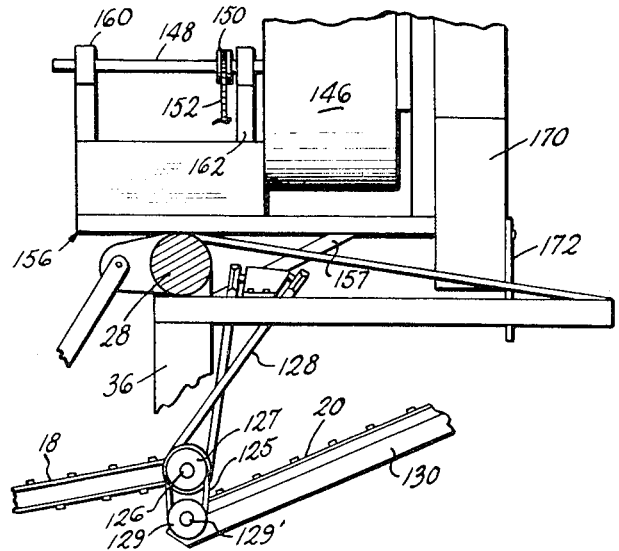
FIG. 8 is an enlarged, fragmentary side elevation of the device taken through the plane VIII—VIII of FIG. 1.

In a similar manner, the first vertical conveyor 18 is entrained about an idler 125 at its lower end (FIGS. 6 and 9), supported between an angle brace 125' and the rigid side of the bed 50. At its upper end, conveyor 18 is entrained about a drive roller 126 (FIGS. 6 and 8) having a drive pulley 127 mounted at one end, about which a V-belt 128 is entrained, to be mentioned more specifically hereinafter. Drive pulley 127 is a double pulley, and a second belt 125 entrained about it also passes downwardly and around a drive pulley 129 attached to a drive roller 129' at the bottom end of the second vertical conveyor 20 (FIG. 8), by which the latter is driven. As will be understood, the upper end of conveyor 20 passes around an appropriate idler roller (not specifically shown) which may be mounted between the opposite side extremities of a channel-shaped base member 130, housing the lower extremities of this conveyor and providing a means for supporting it in a desired vertical position. The aforementioned drive belt 128 for the vertical conveyors 18 and 20 is driven by a drive pulley 132 (FIG. 1) mounted on a shaft 134 which is journaled in a bearing block 136 secured in position atop the main lateral support bar 28. At its end opposite drive pulley 132, drive shaft 134 has a sprocket 138 for a chain 140 driven by a sprocket 142 mounted at the end extremity of the power take-off shaft 110 disposed atop the tongue 24.

As indicated previously, a blower means 22 is mounted in position over the second vertically inclined conveyor 20 (FIGS. 1, 6 and 7), for the purpose of drawing away grass, weeds and other foreign constituents from the stalks of asparagus being conveyed up conveyor 20. The blower 22 may comprise a rotary impeller 144 (FIG. 7) mounted within a generally cylindrical blower housing 146 and driven by an impeller shaft 148 (FIG. 6), on which a sprocket 150 is mounted to rotate the impeller shaft in response to movement of a drive chain 152 entrained about both sprocket 150 a larger-diameter sprocket 154 (FIG. 1) mounted on the same shaft 134 which serves to drive pulley 132 and V-belt 128 for the vertical conveyors 18 and 20, as mentioned previously.

The blower 22 is mounted upon a support platform 156 (FIG. 6), which may be comprised of an open framework of rigid angle members or the like, rigidly mounted atop the primary lateral support bar 28 and braced by a support member 157 (FIGS. 8 and 10) extending downwardly to vertical support 36 for wheel 32. More particularly, the blower housing 146 may be supported upon platform 156 by a vertical brace 158 (FIG. 6), as well as by the impeller shaft 148, which is journaled in upstanding bearing support members 160 and 162 having an interconnecting brace or support 164 which is also secured to the platform 156. The outlet or exhaust of the blower is through a laterally directed opening 166 (FIG. 7), while the inlet is coaxially of the impeller vanes or blades 144 and through an inlet hood 168 defining a downwardly extending, generally rectangular inlet duct portion 170 (FIG. 6) defining an inlet opening at its lowermost side, positioned immediately above the conveyor 20 (FIGS. 6 and 7). Preferably, a vertically adjustable inlet plate 172 is secured along at least one of the two largest sides of the inlet duct portion 170 to provide a means for positioning the inlet duct with respect to the conveyor 20, whereby the amount of negative pressure effectively acting upon materials on the conveyor may be adjusted to provide optimum litter-removing operation.

As previously described the conveyors 16 and 18, the cutter bar assembly 12, and the reel portion 14, as well as the other structure defining the bed 50, are all supported upon the pivotal braces 58 and 60 and the tubular support bar 62, such that the vertical position of the cutter bar assembly 12 and the other associated structures may be changed by pivotal movement of the braces 58 and 60 about their points of attachment to the vertical braces 34 and 36 (FIG. 2). The braces 58 and 60 and the tubular support bar 62 are held in a vertically suspended position by an adjustable linkage arrangement comprising two spaced-apart pairs of support straps or links 174 and 176 (FIGS. 1, 2 and 6), each pair of which extends between a rigid support plate 178 or 180, welded or otherwise secured to the primary support bar 28, and one of a pair of similar support plates 182 and 184, which are rigidly secured to the pivotal support bar 62 positioned beneath the device.

In this arrangement, a pair of hydraulic power cylinders 186 and 188 are mounted with their housings secured to the rear wall 56 of the bed 50, and with their hydraulic rams secured to the lowermost support plates 182 and 184, preferably at a point radially outwardly of the point of attachment to such support plates of the pairs of links or support straps 174 and 176, respectively. Downward excursion of the rams of power cylinders 186 and 188 will pivot the support plates 182 and 184 and rotate the tubular support 62, in a clockwise direction. This will exert tension on the pairs of support straps 174 and 176 and, in effect, pull the entire cutter bar assembly and bed of the harvester device to a position of increased elevation with respect to the ground surface by a clockwise rotational movement of the major support braces 58 and 60 with respect to their points of attachment to the upright braces 34 and 36. Conversely, retraction of the rams of power cylinders 186 and 188 will cause a counter-clockwise rotation of tubular support bar 62 and its attached support plates 182 and 184, thereby causing a lowering of the cutter bar assembly and bed. Any such adjustment in the position of the cutter bar assembly 12 changes the level at which asparagus stalks (such as are seen at 190 in FIG. 2) are cut, and it will be appreciated that by controlling such vertical adjustment of the cutter bar assembly, a uniform cutting height may be consistently maintained with respect to the level of the ground surface, shown at 192 in FIG. 2.

In accordance with the invention, the height of the cutter assembly 12 is continuously controlled in an automated manner, by sensing the actual contour of the ground surface. The contour of the ground is sensed or monitored by a plurality of spaced-apart feeler arms or sensor elements 194 (FIGS. 1, 2, 3, 5, 6 and 10). Each such feeler arm preferably has a pivotally attached contact shoe 196 at its outermost end extremity, which actually rides along the surface of the ground, and each of the arms 194 is pivotally mounted within a U-shaped mounting bracket 198 (FIGS. 2, 3, 5 and 6), which is rigidly secured in place to the underside of one of the mounting plate members 70 (FIGS. 3 and 5) of the cutter bar assembly, beneath the forwardly extending flange portion 68 of the mounting channel 69. As stated, the feeler arms 194 are pivotally attached to the mounting brackets 198, as by a pivot pin 200, and each is freely pivotal, thereby allowing the contact shoes 196 to gently ride along the surface of the earth, following its contours.

Immediately above the various feeler arms 194 in their respective mounting brackets 198 is a follower arm 202 (FIGS. 3 and 5), having a forward end extremity which rides the top of its respective feeler arm 194 and which follows movements thereof resulting from deviations and undulations in the surface of the earth. The various follower arms 202 are each attached to an elongated control shaft 204, as by an integral boss 203, through which the control shaft extends. A set screw or the like (not specifically shown) may be used to prevent each of the various follower arms from sliding laterally along control shaft 204, and it is to be noted that relative position adjustment of the follower arms and sensor arms 194 may readily be accomplished to accommodate a particular row-planting arrangement, by merely loosening a given mounting bracket 198 and shifting it laterally of the cutter bar. As illustrated, the control shaft 204 is preferably hexagonal, or of other non-round configuration, for positive prohibition of relative movement between it and the various follower arms.

As illustrated in FIG. 1, the control shaft 204 extends laterally or endwise beyond the cutter bar and reel at least a brief distance, and is coupled by a link 206 (FIG. 4) to a turnbuckle 208 or other similar adjustable linkage, which in turn is secured to an operating lever 210. The latter is pivotally mounted by a pin or bolt 212 to a support plate 214, to which the aforementioned control valve 48 is attached and by which the latter may be secured to the braces 42 associated with the tongue 24. A return spring 216 is secured between the support plate 214 and the free end of operating lever 210, and a drawshaft 218 connects the spool of control valve 48 to a medial point along the length of operating lever 210. The control valve spool is also operatively connected to a manual control lever or linkage 220, which may serve as an on-off selector for automated operation of the cutter bar through the control valve 48. As illustrated in FIG. 4, control lever 220 may be coupled through a pivotal linkage 221 to a spring-biased extension rod 222, which is operative to selectively block or unblock movement of the control valve spool. As will be seen upon inspection, hoses or tubing 224 serves to interconnect the control valve 48 with the pump 44 and the hydraulic cylinders 186 and 188 which are operative to raise and lower the cutter bar and bed assembly, through the aforementioned hydraulic fluid manifold 46.

As will appear from the foregoing description, the harvester device of the invention is pulled by its drawbar or tongue 24, with the power take-off of the tractor or other pulling vehicle intercoupled with the power take-off shaft 110 of the harvester. As the harvester is pulled along, the bed 50 and cutter bar assembly extends laterally of the pulling vehicle, but travels along a parallel course. As the harvester is pulled along in this manner, the cutter bar continuously seeks and travels along a predetermined height, established by the power cylinders 186 and 188 in response to the operation of control valve 48, and as a function of the feeler arms or sensor elements 194, whose position is transmitted by the follower arms 202 to the control shaft 204, and thence to the control valve 48, all by a direct, mechanical linkage. In this operation, it is the upward movement of the feeler arms 194 in response to ridges, bumps, and the like, which operates to cause automatic, and immediate, elevation of the cutter bar. That is, if any of the feeler arms 194 are raised in this manner, the control shaft 204 must be simultaneously rotated, thereby changing the position of the spool within the control valve 48 immediately; on the other hand, if any of the feeler arms 194 drops downwardly, as when traversing a depressed or hollowed area in the ground, the follower arm 202 for that particular sensor arm will not follow the sensor arm and thus cause an immediate change in the control valve, since such follower arm will be held in the same elevated position as all of the other follower arms 202 connected along the length of the control shaft 204, and that position is determined by the highest ground position sensed by any of the ground-following feeler arms 194.

In this manner, the harvester will always operate to prohibit ground-scalping, and by its very nature will always operate to cut the growing asparagus at the shortest length which is possible for any detected condition of ground surface configuration along the length of the cutter bar. The harvesting of a quality product is therefore assured, inasmuch as this is thought to be the most desired condition. On the other hand, it will be apparent that the converse situation could be provided wherever desired, as to consistently cut the longest possible length of asparagus for any detected ground surface configuration, by merely rearranging the ground-engaging feeler arms and their respective followers so that the followers positively follow all downward excursions of the feeler arms, but are not individually affected by upward excursion of any single such arm. Finally, it should be noted that the cutter bar and its associated structures may readily be locked into an elevated position, as for towing of the machine and the like where cutting is not in process. All that is required for this is to provide a rigid linkage member (not specifically shown) adjacent the power cylinders 186 and 188, with an effective length sufficient to index against a stop member rigidly connected to the rotatable support shaft 62 at a point where the cutter bar is a predetermined distance above the ground, whereupon such linkages may bear the load otherwise borne by the power cylinders, and the latter may be relaxed.

Figure 9:
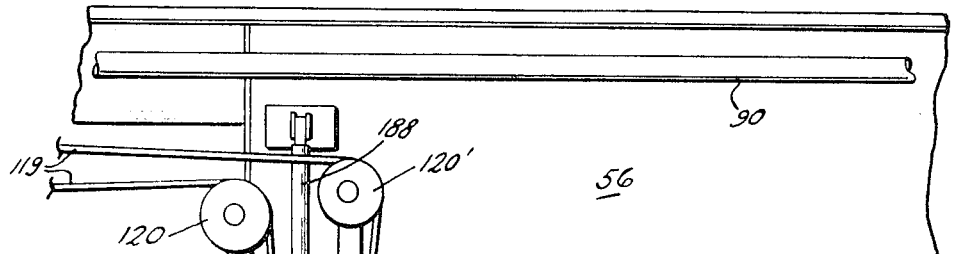
FIG. 9 is an enlarged, fragmentary rear elevation taken through the plane IX—IX of FIG. 1.

As the harvester is operated to harvest asparagus, in the general manner set forth above, the cut stalks of asparagus fall onto the inclined catcher 73 and are swept from the latter onto the conveyors 16 and 18, by operation of the sweeper reel 14. Conveyor 16 moves laterally to transfer its stalks onto conveyor 18, which moves the transferred asparagus upwardly and rearwardly of the cutter bar, along with the lesser quantity of asparagus which was swept directly onto this conveyor after having been cut. In turn, conveyor 18 transfers its load to conveyor 20, which carries it still further upward and rearward, to ultimately deposit it into a following wagon or the like. In this chain of conveyance, it is to be noted that, while the discharge end of conveyor 18 may conveniently be disposed above conveyor 20 to allow the asparagus to fall from the former onto the latter (FIG. 6), this arrangement is not required with respect to the discharge end of conveyor 16 and conveyor 18. Instead, as indicated in FIGS. 6 and 9, conveyor 16 may terminate short of conveyor 18 and be elevated somewhat with respect to the latter, so that asparagus is tossed lightly from the one to the other. By so doing, stalks which are lighter in weight will be tossed further than those which are heavier, resulting in a distribution of the transferred asparagus upon the belt of conveyor 18. Of course, the speed of conveyor 16 directly affects the tossing action taking place at its discharge, and, in general, this operation calls for operating speeds somewhat higher than those required to merely drop articles off the end. Proper speeds are, however, easily obtained by selection of a desired drive ratio for conveyor 16, as will be readily appreciated.

It is entirely conceivable that those skilled in the art may well devise certain variations and modifications of the preferred embodiments disclosed and described hereinabove. Consequently, the specific structures which are illustrated and described should be regarded as being for purposes of illustration, and not as determinative of the only practical or desirable way of implementing the concept on which this invention is based.

I therefore particularly point out and distinctly claim as my invention:

1. An asparagus harvester device, comprising in combination: cutter means for cutting a flat swath of asparagus; means for mounting said cutter means and controllably positioning the cutting height thereof; control means having ground-contacting sensor elements and coupled to said controllable mounting means, for effecting continuous repositioning of said cutter means in accordance with sensed ground surface topography, to maintain said cutting height at a predetermined level above the actual level of the ground, said ground-contacting sensor elements being positioned to contact the ground a predetermined distance ahead of said cutter means relative to the direction of travel of the harvester device when in operation; catcher means disposed generally adjacent said cutter means, for receiving the asparagus cut by the cutter; sweeper means disposed generally above said catcher means and having at least one flexible sweep element for sweeping cut asparagus from said catcher means; and conveyor means comprising a lateral conveyor mounted behind and extending along said catcher means for receiving cut asparagus stalks swept from said catcher means by said sweeper means and transferring said stalks to one side of said harvester device, and longitudinal conveyor means for receiving said stalks from said lateral conveyor and for transferring such stalks to a desired receiver.

2. The asparagus harvester device of claim 1, wherein said mounting and positioning means for said cutter includes at least one power cylinder mounted such that movement of its ram effectively repositions the cutter means to change its cutting height.

3. The asparagus harvester device of claim 2, wherein said control means includes a control valve coupled to said power cylinder to control the operation thereof, and means for controlling such valve in response to said ground-contacting sensor elements.

4. The asparagus harvester device of claim 1, wherein said sensor elements comprise runner members projecting forwardly of said device.

5. The asparagus harvester device of claim 1, wherein said control means includes a plurality of said ground-contacting sensor elements spaced apart along the length of said cutter means.

6. The asparagus harvester device of claim 5, wherein said control means is operative to cause said mounting means to reposition said cutter means in response to the operation of any of said plural ground-contacting sensor elements.

7. The asparagus harvester device of claim 6, wherein said ground-contacting sensor elements are positioned to contact the ground a predetermined distance ahead of said cutter means relative to the direction of travel of the harvester device when in operation.

8. The asparagus harvester device of claim 1, wherein said sweeper means comprises a rotatable reel member having a plurality of flexible sweep elements.

9. The asparagus harvester device of claim 8, wherein said sweep elements comprise elongated flaps of resilient sheet material.

10. The asparagus harvester device of claim 1, wherein said catcher means comprises an elongated member having a generally flat upper surface.

11. The asparagus harvester device of claim 10, wherein said catcher member has a generally flat upper surface angled upwardly and rearwardly of said cutter means.

12. The asparagus harvester device of claim 1, including means for impelling a current of air past the cut asparagus stalks to remove foreign constituents therefrom.

13. The asparagus harvester device of claim 12, wherein said air current-impelling means includes a power-driven fan disposed in proximity to said conveyor means.

14. The asparagus harvester device of claim 12, wherein said air current-impelling means comprises an impeller member driven to draw air past the cut asparagus and thereby drawing said foreign constituents away from the latter.

15. The asparagus harvester device of claim 1, wherein said cutter means comprises a sickle bar assembly.

16. In an asparagus harvester device, of the type having an elongated cutter means mounted to be moved along a path generally parallel to and above the surface of the earth to cut a swath of asparagus at a generally uniform height, the improvement comprising: means for monitoring the level of the ground immediately ahead of said cutter and sensing deviations in such level, and means for continuously repositioning the cutting height of the cutter in response to the deviations in ground level sensed by said monitoring means.

17. The improvement in asparagus harvester devices of claim 16, wherein said monitoring means comprises a plurality of mutually spaced sensing elements.

18. The improvement in asparagus harvester devices of claim 17, wherein said sensing elements comprise ground-engaging members.

19. The improvement in asparagus harvester devices of claim 17, wherein said cutting height-repositioning means includes hydraulically powered means and a valve for controlling the latter, and wherein each of said sensing elements is coupled to said valve to vary the same in accordance with sensed ground level.

* * * * *